US009047862B2

(12) United States Patent
Jeong et al.

(10) Patent No.: US 9,047,862 B2
(45) Date of Patent: Jun. 2, 2015

(54) AUDIO SIGNAL PROCESSING METHOD, AUDIO APPARATUS THEREFOR, AND ELECTRONIC APPARATUS THEREFOR

(75) Inventors: Jae-hoon Jeong, Yongin-si (KR); So-young Jeong, Seoul (KR); Jeong-su Kim, Yongin-si (KR); Jung-eun Park, Gwacheon-si (KR); Woo-jung Lee, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 412 days.

(21) Appl. No.: 13/483,571

(22) Filed: May 30, 2012

(65) Prior Publication Data

US 2012/0310638 A1 Dec. 6, 2012

Related U.S. Application Data

(60) Provisional application No. 61/491,260, filed on May 30, 2011.

(30) Foreign Application Priority Data

Apr. 9, 2012 (KR) .................. 10-2012-0036799

(51) Int. Cl.
*G10L 21/02* (2013.01)
*H04B 3/20* (2006.01)
*G10L 19/008* (2013.01)
*G10L 15/20* (2006.01)
*G10L 21/0208* (2013.01)

(52) U.S. Cl.
CPC ............. *G10L 19/008* (2013.01); *G10L 15/20* (2013.01); *G10L 2021/02082* (2013.01)

(58) Field of Classification Search
CPC .................................................. G10L 19/008
USPC ......................... 704/226, 230, 237
See application file for complete search history.

(56) References Cited

U.S. PATENT DOCUMENTS

| 5,828,756 | A | 10/1998 | Benesty et al. |
| 6,556,682 | B1 | 4/2003 | Gilloire et al. |
| 6,895,093 | B1 | 5/2005 | Ali |
| 7,181,019 | B2* | 2/2007 | Breebaart et al. ............ 381/23 |
| 8,498,422 | B2* | 7/2013 | Oomen et al. ................ 381/23 |
| 8,538,037 | B2* | 9/2013 | Herre et al. .............. 381/94.3 |
| 2002/0176585 | A1* | 11/2002 | Egelmeers et al. ........ 381/71.11 |
| 2009/0304198 | A1 | 12/2009 | Herre et al. |

OTHER PUBLICATIONS

Benesty et al., "A better understanding and an improved solution to the specific problems of stereophonic acoustic echo cancellation," IEEE Trans. Speech and Proc., vol. 6, No. 2, pp. 156-165, 1998.
Toole et al., "Lateralization judgments and the nature of binaural acoustic images," The Journal of the Acoustical Society of America, vol. 37, pp. 319-324, 1965.

(Continued)

*Primary Examiner* — Vincent P Harper
(74) *Attorney, Agent, or Firm* — Sughrue Mion, PLLC

(57) ABSTRACT

An audio apparatus including a decorrelator for generating decorrelated signals by applying a phase shifting value adjusted based on a correlation difference between audio signals included in a multi-channel signal to the audio signals; and a speaker set including at least two speakers for outputting acoustic signals corresponding to the decorrelated signals.

23 Claims, 8 Drawing Sheets

(56) References Cited

OTHER PUBLICATIONS

ITU-R, Recommendation BS. 1534-1, "Method for the subjective assessment of intermediate quality levels of coding systems," pp. 1-18, Jan. 2003.

Breebaart et al., "MPEG Spatial Audio Coding / MPEG Surround: Overview and Current Status." 119th AES Convention, New York, pp. 1-17, 2005.

* cited by examiner

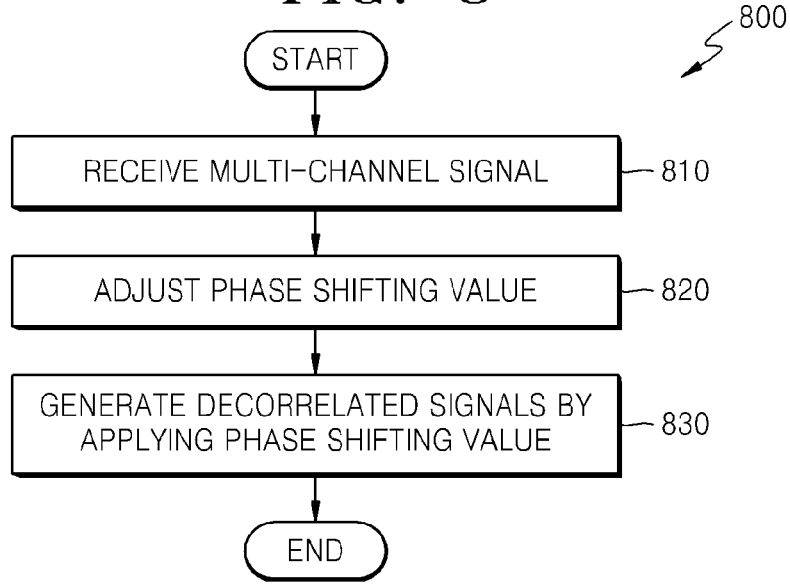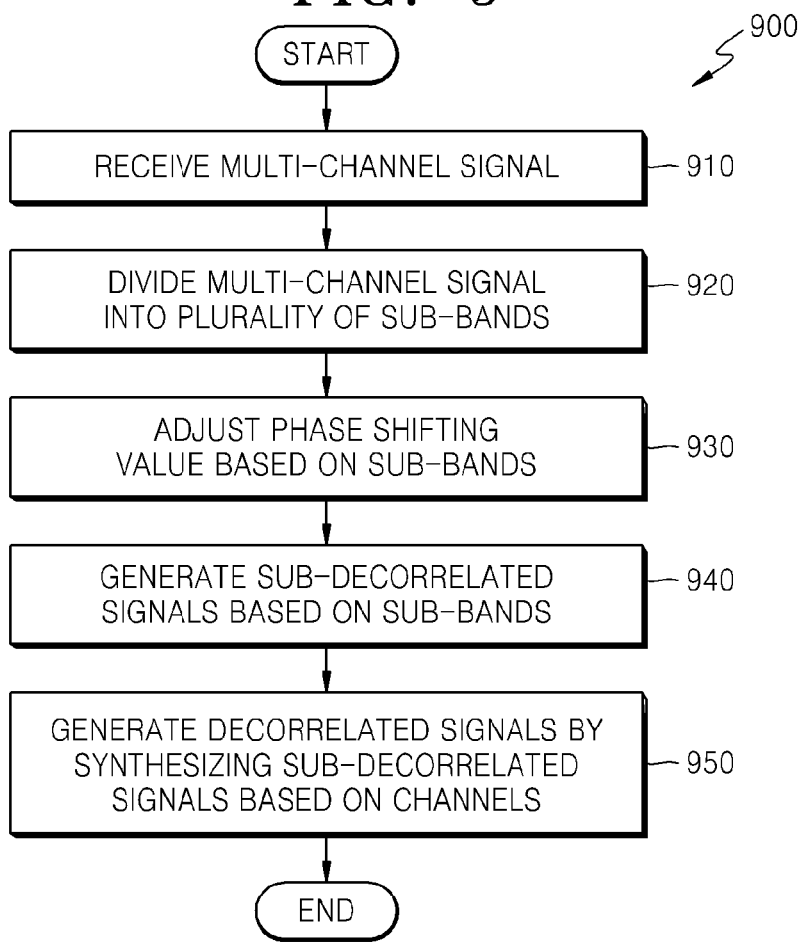

AUDIO SIGNAL PROCESSING METHOD, AUDIO APPARATUS THEREFOR, AND ELECTRONIC APPARATUS THEREFOR

CROSS-REFERENCE TO RELATED PATENT APPLICATION

This application claims priority from U.S. Provisional Application No. 61/491,260, filed on May 30, 2011, in the US PTO and Korean Patent Application No. 10-2012-0036799, filed on Apr. 9, 2012, in the Korean Intellectual Property Office, the disclosures of which are incorporated herein in their entirety by reference.

BACKGROUND

1. Field

Exemplary embodiments relate to an audio signal processing method, an audio apparatus using the same, and an electronic apparatus using the same, and more particularly, to an audio signal processing method for receiving a multi-channel signal and outputting corresponding acoustic signals, an audio apparatus using the same, and an electronic apparatus using the same.

2. Description of the Related Art

Audio apparatuses may output received multi-channel signals through a plurality of speakers. In addition, the audio apparatuses may receive a voice signal corresponding to a voice of a user, recognize the received voice signal, and perform an operation corresponding to a command, operation, or request based on the recognized voice signal. Hereinafter, the recognizing of a received voice signal and the performing of an operation corresponding to a command, operation, or request based on the recognized voice signal are called a voice recognition operation.

In an audio apparatus capable of performing the voice recognition operation, when a voice signal is received through a predetermined microphone while acoustic signals are being output through a plurality of speakers, the audio apparatus must acquire only the voice signal by removing the acoustic signals from among signals input to the microphone. Then, the audio apparatus recognizes the acquired voice signal.

To remove acoustic signals as described above, Multi-Channel Acoustic Echo Cancellation (MCAEC) is used. MCAEC may be implemented using an echo cancellation filter.

If the acoustic signals output through the plurality of speakers have a low correlation, the echo cancellation filter converges to a predetermined value, thereby effectively canceling the acoustic signals. However, if the acoustic signals output through the plurality of speakers have a high correlation, the echo cancellation filter diverges without converging. Accordingly, since residual echo remains in a signal for voice recognition, the voice recognition operation cannot be effectively performed.

That is, if the echo cancellation filter cannot effectively cancel the acoustic signals, the audio apparatus cannot correctly recognize the voice signal and cannot perform an operation or command corresponding to the voice signal.

Thus, in audio apparatuses capable of recognizing a voice signal, an audio apparatus for effectively lowering a correlation between acoustic signals output to a plurality of speakers is necessary.

SUMMARY

The exemplary embodiments provide an audio signal processing method for effectively lowering a correlation between acoustic signals output to a plurality of speakers, an audio apparatus therefor, and an electronic apparatus therefor.

The exemplary embodiments also provide an audio signal processing method for correctly recognizing an input voice signal and an electronic apparatus therefor.

According to an aspect of an exemplary embodiment, an audio apparatus includes: a decorrelator for generating decorrelated signals by applying a phase shifting value adjusted based on a correlation difference between audio signals included in a multi-channel signal to the audio signals; and a speaker set including at least two speakers for outputting acoustic signals corresponding to the decorrelated signals.

The decorrelator may generate the decorrelated signals by applying a phase shifting value adjusted based on a phase difference between the audio signals to the audio signals.

The decorrelator may receive the multi-channel signal including first and second channel audio signals.

The decorrelator may reduce the phase shifting value when a phase difference between the first and second channel audio signals is great.

The decorrelator may set the phase shifting value to 0 when the phase difference between the first and second channel audio signals is 180°.

The decorrelator may set the phase shifting value to a predetermined limit value when the phase difference between the first and second channel audio signals is 0°.

The decorrelator may generate first and second decorrelated signals corresponding to the first and second channel audio signals by subtracting the phase shifting value from a phase of the first channel audio signal and adding the phase shifting value to a phase of the second channel audio signal, respectively.

The decorrelator may include: a pre-processor for receiving the multi-channel signal, including the first and second channel audio signals, dividing the multi-channel signal into a plurality of sub-bands, and generating first and second channel sub-audio signals in each of the plurality of sub-bands; a decorrelation processor for generating first and second sub-decorrelated signals by applying a phase shifting value adjusted based on a phase difference between the first and second channel sub-audio signals to the first and second channel sub-audio signals; and a synthesizer for generating the first decorrelated signal by synthesizing the first sub-decorrelated signals in the plurality of sub-bands and generating the second decorrelated signal by synthesizing the second sub-decorrelated signals in the plurality of sub-bands.

The decorrelation processor may generate the first and second sub-decorrelated signals by setting a corrected phase shifting value by multiplying the phase shifting value by a predetermined weighting value based on sub-bands, subtracting the corrected phase shifting value from a phase of the first channel sub-audio signal, and adding the corrected phase shifting value to a phase of the second channel sub-audio signal.

The decorrelation processor may set the predetermined weighting value based on sub-bands.

The decorrelation processor may set the predetermined weighting value in one sub-band and the predetermined weighting value in another sub-band adjacent to the one sub-band to have different signs.

The decorrelation processor may divide the plurality of sub-bands into a plurality of groups and set the predetermined weighting value based on groups.

The decorrelation processor may set the predetermined weighting value in one group and the predetermined weighting value in another group adjacent to the one group to have different signs.

The audio apparatus may further include: an echo filter unit for generating echo signals corresponding to the decorrelated signals; a microphone for receiving the acoustic signals and a voice signal; and a processor for processing voice recognition on a subtraction signal obtained by subtracting the echo signals from an output signal of the microphone.

According to another aspect of an exemplary embodiment, an electronic apparatus includes: a decorrelator for generating decorrelated signals by applying a phase shifting value adjusted based on a correlation difference between audio signals included in a multi-channel signal to the audio signals; an echo filter unit for generating echo signals corresponding to the decorrelated signals; a speaker set including at least two speakers for outputting acoustic signals corresponding to the decorrelated signals; a microphone for receiving the acoustic signals and a voice signal; and a processor for processing voice recognition on a subtraction signal obtained by subtracting the echo signals from an output signal of the microphone.

According to another aspect of an exemplary embodiment, an audio signal processing method includes: receiving a multi-channel signal including audio signals; adjusting a phase shifting value based on a correlation difference between the audio signals; and generating decorrelated signals by applying the phase shifting value to the audio signals.

BRIEF DESCRIPTION OF THE DRAWINGS

The above and other features and advantages of the exemplary embodiments will become more apparent by describing in detail exemplary embodiments thereof with reference to the attached drawings in which:

FIG. 8 is a flowchart illustrating an audio signal processing method according to an exemplary embodiment;

FIG. 9 is a flowchart illustrating an audio signal processing method according to an exemplary embodiment.

DETAILED DESCRIPTION

Expressions such as "at least one of," when preceding a list of elements, modify the entire list of elements and do not modify the individual elements of the list.

An audio signal processing method, an audio apparatus, and an electronic apparatus will now be described in detail with reference to the accompanying drawings.

Figure 1:
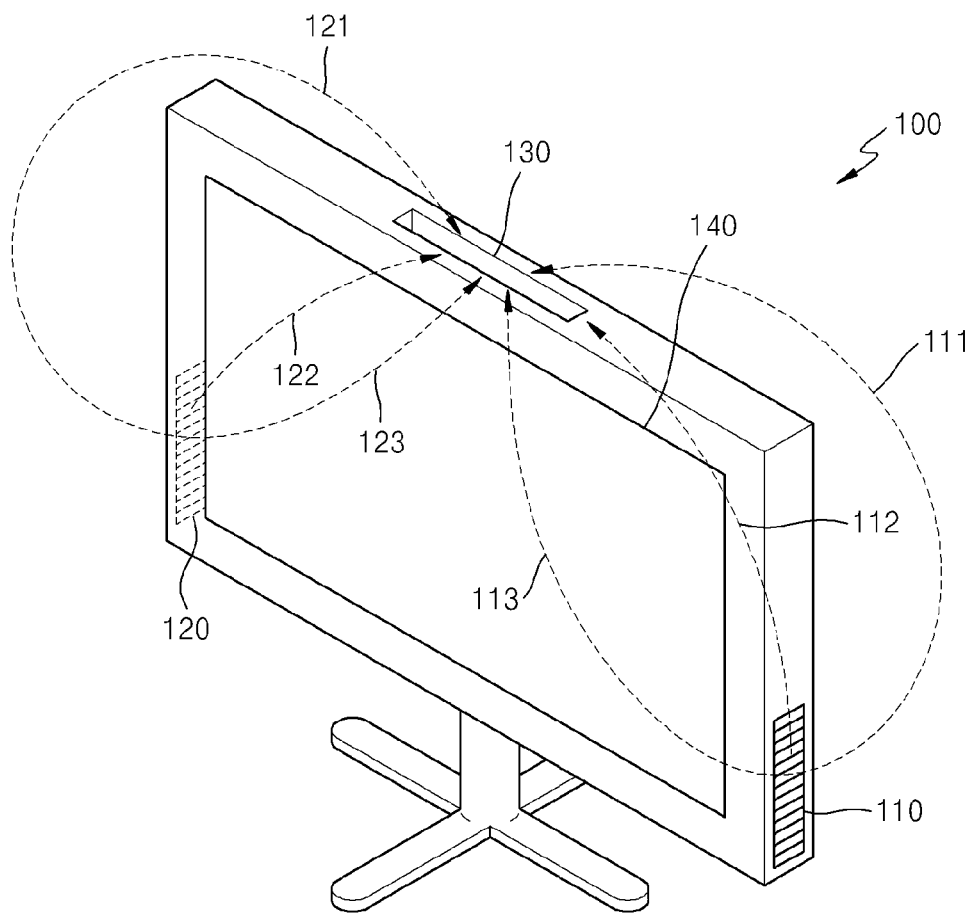
FIG. 1 is a perspective view of an electronic apparatus.

FIG. 1 is a perspective view of an electronic apparatus 100. The electronic apparatus 100 shown in FIG. 1 is, for example, a digital TV. The electronic apparatus 100 may be any one of various electronic products, including an audio apparatus for outputting an audio signal. For example, the electronic apparatus 100 may be a digital TV, an audio system, a refrigerator, a washing machine, a personal computer, a mobile computer, a pad-type terminal, or a mobile phone.

The electronic apparatus 100 includes an audio apparatus (not shown) including a decorrelator (not shown) and a speaker set. The decorrelator may be included in a circuit block included in the electronic apparatus 100, and the speaker set may include at least two speakers, for example, first and second speakers 110 and 120.

The electronic apparatus 100 may further include at least one of a microphone 130 and a display unit 140. The microphone 130 may include a microphone array (not shown) and may receive all audible audio signals. In detail, the microphone 130 may receive a voice signal generated by a user.

The decorrelator adjusts and outputs a correlation among a plurality of audio signals included in a multi-channel signal. The correlation-adjusted audio signals are output through the first and second speakers 110 and 120.

When the user inputs a voice signal into the microphone 130 while audio signals are being output from the first and second speakers 110 and 120, the microphone 130 receives the voice signal in addition to the audio signals output from the first and second speakers 110 and 120.

For example, assuming that the electronic apparatus 100 is a digital TV capable of performing a video call function, the digital TV may output a Picture-In-Picture (PIP) screen on the display unit 140. In a PIP mode, the display unit 140 may output broadcasting images on a main screen and output images of a video call on a sub-screen.

As another example, assuming that the electronic apparatus 100 is a digital TV capable of performing a voice recognition control, when the user inputs a predetermined command or request into the digital TV with a voice signal, the digital TV may perform an operation corresponding to the input voice signal. That is, when the user inputs a voice signal into the microphone 130, the electronic apparatus 100 may perform an operation corresponding to the input voice signal.

When a voice signal is received while audio signals are being output from the first and second speakers 110 and 120, the electronic apparatus 100 must detect or discern only the voice signal and not the audio signals output from the first and second speakers 110 and 120. To extract the voice signal from among all signals input to the microphone 130, audio signals output from the speakers must be cancelled from among all the signals input to the microphone 130 by using an echo cancellation filter (not shown).

The audio signals output from the first and second speakers 110 and 120 are input to the microphone 130 through various paths 111, 112, 113, 121, 122, and 123 according to a surrounding environment where the electronic apparatus 100 is located. Hereinafter, paths 111, 112, 113, 121, 122, and 123 are called 'actual echo paths'. The actual echo paths may vary according to the surrounding environment and noise when the audio signals are output, so it is difficult to clearly determine the actual echo paths. Thus, an impulse response function is designed by estimating echo paths corresponding to the actual echo paths (hereinafter, 'estimated echo paths') and reflecting the estimated echo paths. The echo cancellation filter may filter echo signals corresponding to the audio signals based on the designed impulse response function. The echo cancellation filter may be implemented using an echo filter unit 620 and an adder 671, which will be described with reference to FIG. 6.

The electronic apparatus 100 may receive the multi-channel signal including a right channel (R-channel) audio signal and a left channel (L-channel) audio signal from the outside or may itself generate the multi-channel signal. When the speaker set includes the first and second speakers 110 and 120, the first speaker 110 may output the R-channel audio signal, and the second speaker 120 may output the L-channel audio signal.

Electronic apparatuses and audio apparatuses which may be included in the electronic apparatuses will now be described in detail with reference to FIGS. 2 to 7.

Figure 2:
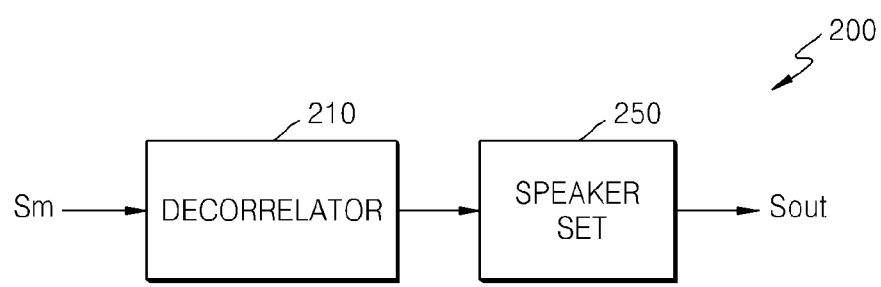
FIG. 2 is a block diagram of an audio apparatus according to an aspect of exemplary embodiment.

FIG. 2 is a block diagram of an audio apparatus 200 according to an aspect of an exemplary embodiment.

Referring to FIG. 2, the audio apparatus 200 includes a decorrelator 210 and a speaker set 250.

The decorrelator 210 generates decorrelated signals Sout corresponding to audio signals included in a multi-channel signal Sm by reducing a correlation between the audio signals In detail, the decorrelator 210 receives the multi-channel signal Sm and generates the decorrelated signals Sout by applying a phase shifting value adjusted based on a correlation difference between the audio signals included in the multi-channel signal Sm to the audio signals. The multi-channel signal Sm includes a plurality of audio signals corresponding to a plurality of channels. For example, the multi-channel signal Sm may include an R-channel audio signal and an L-channel audio signal. As another example, the multi-channel signal Sm may include 5.1-channel audio signals, 7.1-channel audio signals, or 10.2-channel audio signals.

The speaker set 250 includes at least two speakers for outputting acoustic signals corresponding to the decorrelated signals Sout generated by the decorrelator 210. The number of speakers included in the speaker set 250 may vary according to the number of audio signals included in the multi-channel signal Sm.

In detail, the decorrelator 210 generates the decorrelated signals Sout by applying to the audio signals a phase shifting value adjusted based on a phase difference between the audio signals included in the multi-channel signal Sm. The phase shifting value is a value to be subtracted from or added to a phase of an audio signal included in the multi-channel signal Sm. A corrected phase shifting value may be set by multiplying the phase shifting value by a predetermined weighting value. The corrected phase shifting value will be described in detail with reference to FIG. 5 below. The phase shifting value may be a positive (+) value from 0 to a predetermined limit value. The predetermined limit value is a phase shifting value applied when a phase difference between audio signals is 0 or a value close to 0 and may be differently set according to a filtering performance, a target voice recognition ratio, and a product specification of an echo cancellation filter (not shown) included in the audio apparatus 200.

In addition, the decorrelator 210 may receive the multi-channel signal Sm, including first and second channel audio signals, from an external broadcasting station. The first and second channel audio signals may correspond to the R-channel audio signal and the L-channel audio signal, respectively. Hereinafter, the multi-channel signal Sm, including the first and second channel audio signals, is illustrated. In addition, it is illustrated that the decorrelator 210 generates first and second decorrelated signals corresponding to the first and second channel audio signals, respectively.

For example, when the multi-channel signal Sm, including the R-channel audio signal and the L-channel audio signal, is received, the decorrelator 210 sets a phase shifting value based on a phase difference between the R-channel audio signal and the L-channel audio signal. Then, the decorrelator 210 may generate an R-channel decorrelated signal and an L-channel decorrelated signal corresponding to the R-channel audio signal and the L-channel audio signal, respectively, so that the R-channel decorrelated signal and the L-channel decorrelated signal have phases obtained by adding the phase shifting value to a phase of the R-channel audio signal and subtracting the phase shifting value from a phase of the L-channel audio signal, respectively.

In detail, the decorrelator 210 reduces the phase shifting value in inverse proportion to a phase difference between the R-channel audio signal and the L-channel audio signal.

In addition, the decorrelator 210 may set the phase shifting value to 0 when the phase difference between the first and second channel audio signals is 180°. If the phase difference between the first and second channel audio signals is 180°, i.e., $\pi$ (pi), the first and second channel audio signals have opposite phases to each other. Thus, the phase shifting value is set to 0 so that the first and second decorrelated signals have a low correlation even though the first and second decorrelated signals are generated.

In addition, the decorrelator 210 may set the phase shifting value to a predetermined limit value when the phase difference between the first and second channel audio signals is 0°.

In addition, the decorrelator 210 may set phase values for the first and second decorrelated signals by subtracting the phase shifting value from a phase of the first channel audio signal and adding the phase shifting value to a phase of the second channel audio signal. Then, the decorrelator 210 may generate the first and second decorrelated signals having the phase values for the first and second decorrelated signals.

In addition, the decorrelator 210 may set phase values for the first and second decorrelated signals by subtracting a corrected phase shifting value from the phase of the first channel audio signal and adding the corrected phase shifting value to the phase of the second channel audio signal.

Figure 3:
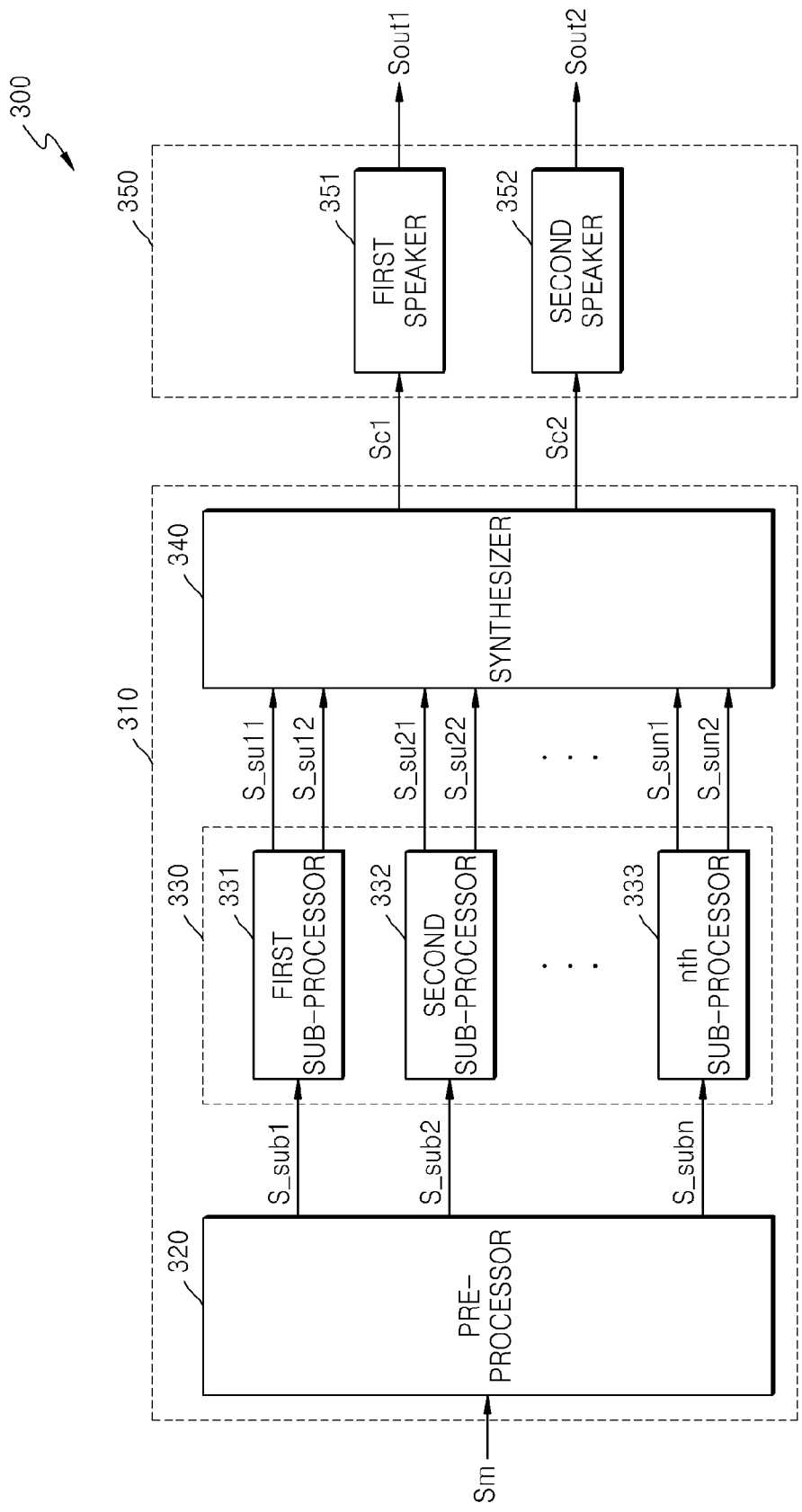
FIG. 3 is a block diagram of an audio apparatus according to another aspect an exemplary embodiment.

FIG. 3 is a block diagram of an audio apparatus 300 according to an aspect of exemplary embodiment. Referring to FIG. 3, the audio apparatus 300 may include a decorrelator 310 and a speaker set 350. Since the audio apparatus 300, the decorrelator 310, and the speaker set 350 correspond to the audio apparatus 200, the decorrelator 210, and the speaker set 250, respectively, a repeated description thereof is omitted. Hereinafter, an operation of generating decorrelated signals by lowering a correlation between audio signals is called a decorrelation operation.

The decorrelator 310 may divide audio signals included in a multi-channel signal Sm into a plurality of sub-bands and generate decorrelated signals based on sub-bands. A sub-band indicates a frequency band from when a frequency band of the multi-channel signal Sm is divided into a plurality of sub-frequency bands. Hereinafter, it is illustrated that the multi-channel signal Sm includes first and second channel audio signals. As described above, the first and second channel audio signals may correspond to an R-channel audio signal and an L-channel audio signal, respectively.

FIG. 3 illustrates that the decorrelator 310 divides the audio signals included in the multi-channel signal Sm into n sub-bands and performs a decorrelation operation for generating decorrelated signals for the n sub-bands.

In detail, the decorrelator 310 includes a pre-processor 320, a decorrelation processor 330, and a synthesizer 340.

The pre-processor 320 receives the multi-channel signal Sm, including the first and second channel audio signals, and divides the multi-channel signal Sm into first to nth sub-audio signals S_sub1 to S_subn.

That is, the pre-processor 320 divides the multi-channel signal Sm into n frequency bands and outputs the first sub-audio signal S_sub1 of a first sub-band to the nth sub-audio signal S_subn of an nth sub-band. The multi-channel signal Sm may include the first and second channel audio signals. In addition, the first sub-audio signal S_sub1 of the first sub-band may include first and second channel sub-audio signals of the first sub-band, and the nth sub-audio signal S_subn of the nth sub-band may include first and second channel sub-audio signals of the nth sub-band.

The decorrelation processor 330 generates first and second sub-decorrelated signals by applying a phase shifting value in a predetermined sub-band, which is adjusted based on a phase difference between first and second channel sub-audio signals in the predetermined sub-band, to the first and second channel sub-audio signals. The phase shifting value will be described in detail with reference to FIG. 4 below.

Figure 4:
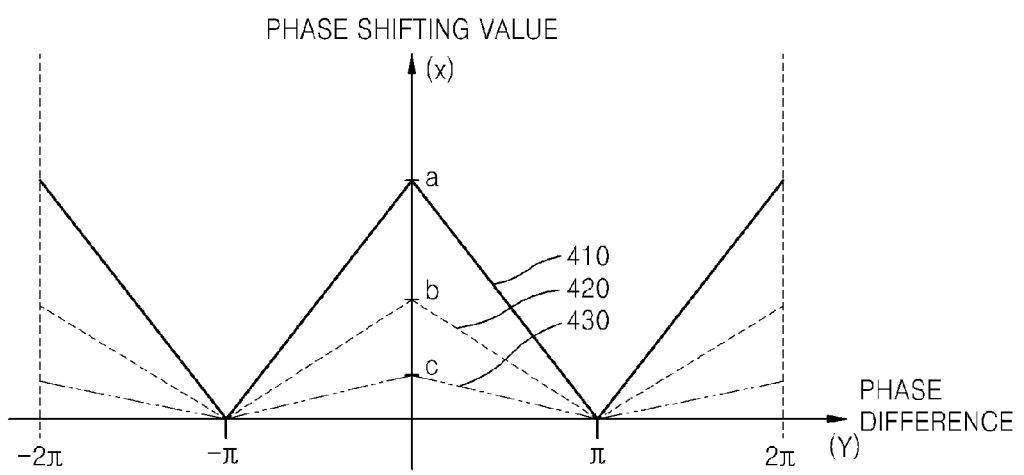
FIG. 4 illustrates graphs for describing a phase shifting value adjustment performed by the audio apparatus according to one or more aspects of exemplary embodiments.

FIG. 4 illustrates graphs 410, 420, and 430 for describing the phase shifting value adjustment performed by the audio apparatus 200 or 300 according to one or more aspects of exemplary embodiments. In FIG. 4, an X-axis indicates a phase difference between first and second channel audio signals, and a Y-axis indicates a phase shifting value. In addition, the X-axis may indicate a phase difference between first and second channel sub-audio signals in a predetermined sub-band. Hereinafter, the X-axis indicates a phase difference between first and second channel audio signals.

Referring to FIG. 4, the graph 410 shows a phase shifting value applied in a high frequency band, the graph 420 shows a phase shifting value applied in an intermediate frequency band, and the graph 430 shows a phase shifting value applied in a low frequency band. FIG. 4 illustrates that a total frequency band is divided into 3 frequency bands, i.e., the high frequency band, the intermediate frequency band, and the low frequency band, and a phase shifting value is adjusted for each divided frequency band. However, it may be designed where the total frequency band is divided into a various number of frequency bands and phase shifting value graphs are optimized for the divided frequency bands. In addition, the phase shifting value graphs may be experimentally optimized so that sound quality distortion is minimized while an echo cancellation filter (not shown) does not diverge.

Referring to the graph 410 of FIG. 4, when a phase difference between first and second channel audio signals corresponding to the high frequency band is 0°, a phase shifting value is set to a predetermined limit value a, which is the maximum value. In addition, when the phase difference between the first and second channel audio signals is 180°, i.e., π (pi), the phase shifting value may be set to 0 or a value close to 0. In detail, the phase shifting value increases as the phase difference between the first and second channel audio signals is small, and the phase shifting value decreases as the phase difference between the first and second channel audio signals is large.

In addition, as a frequency band goes from the high frequency band to the low frequency band, the frequency band is close to an audible frequency band which a user can recognize well. Since distortion of the first or second channel audio signal increases when a phase shifting value is set large in the low frequency band, which is the audible frequency band, the phase shifting value may be set small in the low frequency band, which is the audible frequency band. On the contrary, since the high frequency band is a frequency band which the user cannot audibly recognize well, the user cannot recognize sound quality distortion well even though the phase shifting value is set large. Thus, the phase shifting value may be set large in the high frequency band. Accordingly, predetermined limit values a, b, and c may be set differently according to frequency bands.

The predetermined limit values a, b, and c of a phase shifting value and forms of the phase shifting value graphs 410, 420, and 430 shown in FIG. 4 may be experimentally optimized and determined. For example, a phase shifting value may be set through sound quality distortion experiments so that the echo cancellation filter does not diverge while the sound quality distortion is minimized.

The decorrelation processor 330 may include first to nth sub-processors 331, 332, and 333 for performing the decorrelation operation for n sub-frequency bands.

In detail, the first sub-processor 331 receives first and second channel sub-audio signals S_sub1 in a first sub-band and generates first and second channel sub-decorrelated signals S_su11 and S_su12 corresponding to the first and second channel sub-audio signals S_sub1. The second sub-processor 332 receives first and second channel sub-audio signals S_sub2 in a second sub-band and generates first and second channel sub-decorrelated signals S_su21 and S_su22 corresponding to the first and second channel sub-audio signals S_sub2. The nth sub-processor 333 receives first and second channel sub-audio signals S_subn in an nth sub-band and generates first and second channel sub-decorrelated signals S_sun1 and S_sun2 corresponding to the first and second channel sub-audio signals S_subn.

For example, when the correlation operation in the second sub-band is used as an example, the decorrelation processor 330 receives the sub-audio signal S_sub2 in the second sub-band, which includes the first and second channel sub-audio signals. The second sub-processor 332 adjusts a phase shifting value based on a phase difference between the first and second channel sub-audio signals. The second sub-processor 332 generates the first channel sub-decorrelated signal S_su21 by applying the phase shifting value to the first channel sub-audio signal of the second sub-band and generates the second channel sub-decorrelated signal S_su22 by applying the phase shifting value to the second channel sub-audio signal of the second sub-band.

Since operations of the first sub-processor 331 to the nth sub-processor 333 are the same as the operation of the second sub-processor 332 described above, a detailed description thereof is omitted.

The synthesizer 340 generates a first decorrelated signal Sc1 and a second decorrelated signal Sc2 by synthesizing the first channel sub-decorrelated signals S_su11, S_su21, . . . , S_sun1 and the second channel sub-decorrelated signals S_su12, S_su22, . . . , S_sun2, respectively.

In detail, the synthesizer 340 generates the first decorrelated signal Sc1 corresponding to the total frequency band by synthesizing the first channel sub-decorrelated signals S_su11, S_su21, . . . , S_sun1 in the n sub-bands.

In addition, the synthesizer 340 generates the second decorrelated signal Sc2 corresponding to the total frequency band by synthesizing the second channel sub-decorrelated signals S_su12, S_su22, . . . , S_sun2 in the n sub-bands.

The decorrelation operation of the decorrelator 310 allows the first decorrelated signal Sc1 and the second decorrelated signal Sc2 generated by the synthesizer 340 to have a low correlation therebetween.

The speaker set 350 may include a plurality of speakers, namely, first and second speakers 351 and 352, for receiving the plurality of decorrelated signals, namely, the first and second decorrelated signals Sc1 and Sc2, output from the decorrelator 310 and outputting output audio signals, namely, first and second audio signals Sout1 and Sout2, corresponding to the decorrelated signals, namely, the first and second decorrelated signals Sc1 and Sc2, respectively. FIG. 3 illustrates that the speaker set 350 includes the first speaker 351 and the second speaker 352.

In detail, the first speaker 351 converts the first decorrelated signal Sc1 to a first audio signal Sout1 which the user can audibly recognize and outputs the first audio signal Sout1. The second speaker 352 converts the second decorrelated signal Sc2 to a second audio signal Sout2 which the user can audibly recognize and outputs the second audio signal Sout2.

In addition, the decorrelation processor 330 may set a corrected phase shifting value by multiplying a phase shifting value by a predetermined weighting value. Then, the decorrelation processor 330 may generate first and second sub-decorrelated signals by subtracting the corrected phase shifting value from the phase of the first channel sub-audio signal and adding the corrected phase shifting value to the phase of the second channel sub-audio signal, respectively. The predetermined weighting value may be set differently based on sub-bands. The predetermined weighting value may be set by the decorrelation processor 330 or may be received from the outside as an experimentally optimized value.

In addition, as a frequency band goes from a sub-band of the low frequency band to a sub-band of the high frequency band, the predetermined weighting value may be increased.

Figure 5A:
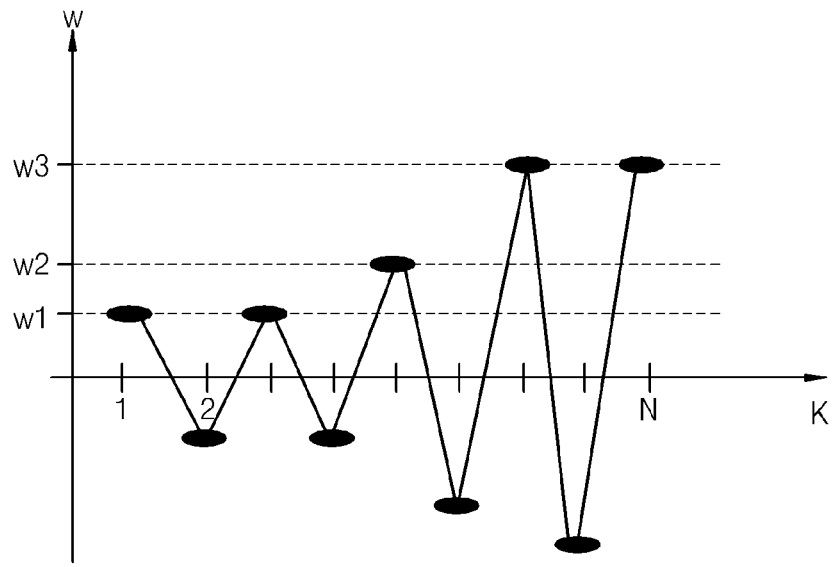
FIGS. 5A and 5B illustrate other graphs for describing a phase shifting value adjustment performed by the audio apparatus according to one or more aspects of exemplary embodiments.
Figure 5B:
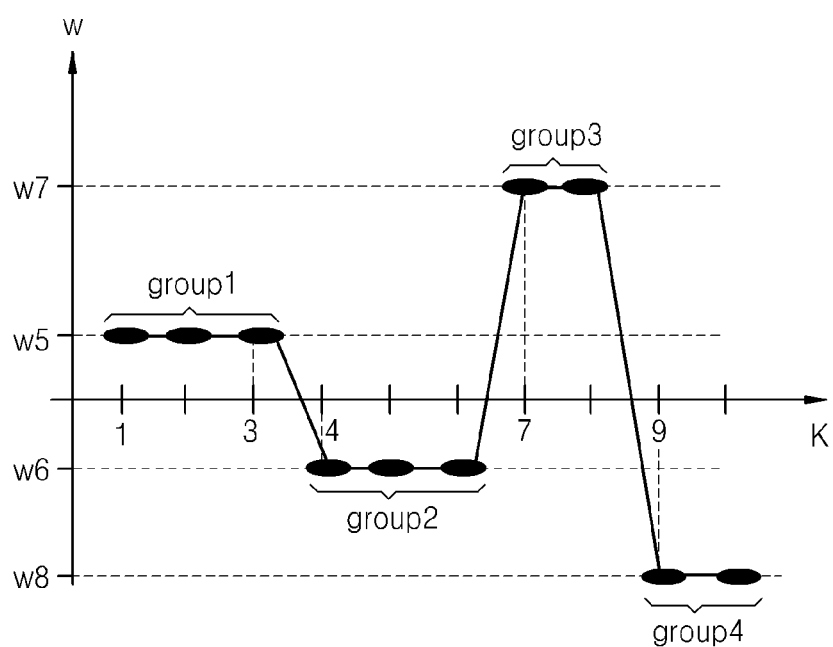

FIGS. 5A and 5B illustrate other graphs for describing a phase shifting value adjustment performed by the audio apparatus 200 or 300 according to one or more aspects of exemplary embodiments. FIG. 5A is a graph for describing a predetermined weighting value according to an aspect of an exemplary embodiment, and FIG. 5B is a graph for describing a predetermined weighting value according to another aspect of an exemplary embodiment.

Referring to FIGS. 5A and 5B, an X-axis indicates the order of sub-bands, and a Y-axis indicates a predetermined weighting value. In detail, the X-axis indicates the order k of sub-bands in the low frequency band to the high frequency band when the total frequency band of the multi-channel signal Sm is divided into n sub-bands.

Referring to FIG. 5A, k=1 indicates the first sub-band, and the first sub-processor 331 generates first and second sub-decorrelated signals corresponding to the first and second channel sub-audio signals by using a corrected phase shifting value by multiplying a phase shifting value by a weighting value w1 corresponding to the first sub-band. A weighting value w2 is a weighting value applied in the second sub-band, and a weighting value w3 is a weighting value applied in the nth sub-band.

In detail, a predetermined weighting value in one sub-band (e.g., k=1) and a predetermined weighting value in another sub-band (e.g., k=2) adjacent to the one sub-band may be set to have different signs. For example, a positive weighting value may be set in sub-bands of an odd order, and a negative weighting value may be set in sub-bands of an even order.

In addition, an absolute value of a weighting value may be set to increase as an order value of a sub-band increases. For example, as a value of the order k of a sub-band increases, an absolute value of a weighting value increases as w1, w2, and w3.

Referring to FIGS. 3 and 5A, when the order k of a sub-band is 1, the first sub-audio signal S_sub1 of the first sub-band, which includes the first channel sub-audio signal and the second channel sub-audio signal, is input to the first sub-processor 331. A phase of the first channel sub-audio signal may be represented as $e^{j\phi_1(k)}$, and the second channel sub-audio signal may be represented as $e^{j\phi_2(k)}$. Here, k denotes an order of a sub-band, $\phi_1(k)$ denotes a phase value of the first channel sub-audio signal in a kth sub-band, and $\phi_2(k)$ denotes a phase value of the second channel sub-audio signal in the kth sub-band.

The phase shifting value described in FIG. 4 may be represented as $e^{j\phi_\Delta(k)}$. When k=1, the first sub-processor 331 may set a phase of a first channel sub-decorrelated signal in the kth sub-band as $e^{j(\phi_1-\phi_\Delta)(k)}$ by subtracting the phase shifting value from the phase of the first channel sub-audio signal. In addition, the first sub-processor 331 may set a phase of a second channel sub-decorrelated signal in the kth sub-band as $e^{j(\phi_2+\phi_\Delta)(k)}$ by adding the phase shifting value to the phase of the second channel sub-audio signal.

When first and second channel sub-decorrelated signals are generated by applying a corrected phase shifting value, a weighting value applied in a predetermined sub-band k may be represented as wk. In this case, the corrected phase shifting value may be represented as $w_k \cdot \phi_\Delta$. Accordingly, when k=1, the first sub-processor 331 may set the phase of the first channel sub-decorrelated signal in the kth sub-band as by $e^{j(\phi_1 - w_k \cdot \phi_\Delta)(k)}$ subtracting the corrected phase shifting value from the phase of the first channel sub-audio signal. In addition, the first sub-processor 331 may set the phase of the second channel sub-decorrelated signal in the kth sub-band as $e^{j(\phi_2 + w_k \cdot \phi_\Delta)(k)}$ by adding the corrected phase shifting value to the phase of the second channel sub-audio signal.

In addition, the first channel sub-decorrelated signal is generated by synthesizing first channel sub-decorrelated signals of all sub-bands, and the second channel sub-decorrelated signal is generated by synthesizing second channel sub-decorrelated signals of all sub-bands. A magnitude of the first and second channel sub-decorrelated signals may vary according to a magnitude of the first and second channel audio signals, and a product specification, such as a maximum power or amplification efficiency, of the audio apparatus 300.

Referring to FIG. 5B, the decorrelator 310 may divide the plurality of sub-bands into a plurality of groups and set a predetermined weighting value having a different value based on groups. In addition, the decorrelator 310 may divide the plurality of sub-bands into a plurality of groups and receive a predetermined weighting value having a different value based on groups from the outside.

As shown in FIG. 5B, first to third sub-bands may be set as a first group, group1, fourth to sixth sub-bands may be set as a second group, group2, seventh and eighth sub-bands may be set as a third group, group3, and ninth and greater sub-bands may be set as a fourth group, group4. In addition, one group (e.g., group1) and another group (e.g., group2) adjacent to the one group may be set to have different signs.

When a sub-decorrelated signal is generated by adjusting a phase of a sub-audio signal, if a first sub-decorrelated signal is generated by subtracting a phase shifting value from a phase of a first channel sub-audio signal and a second sub-decorrelated signal is generated by adding the phase shifting value to a phase of a second channel sub-audio signal, spatial perception of sound is biased to one side. Thus, as described with reference to FIGS. 5A and 5B, signs of weighting values in sub-bands may be set differently so that the spatial perception of sound is alternately biased to the left and the right. Accordingly, spatial perception which the user feels when the user listens to audio may be prevented from being biased to one side.

Figure 6:
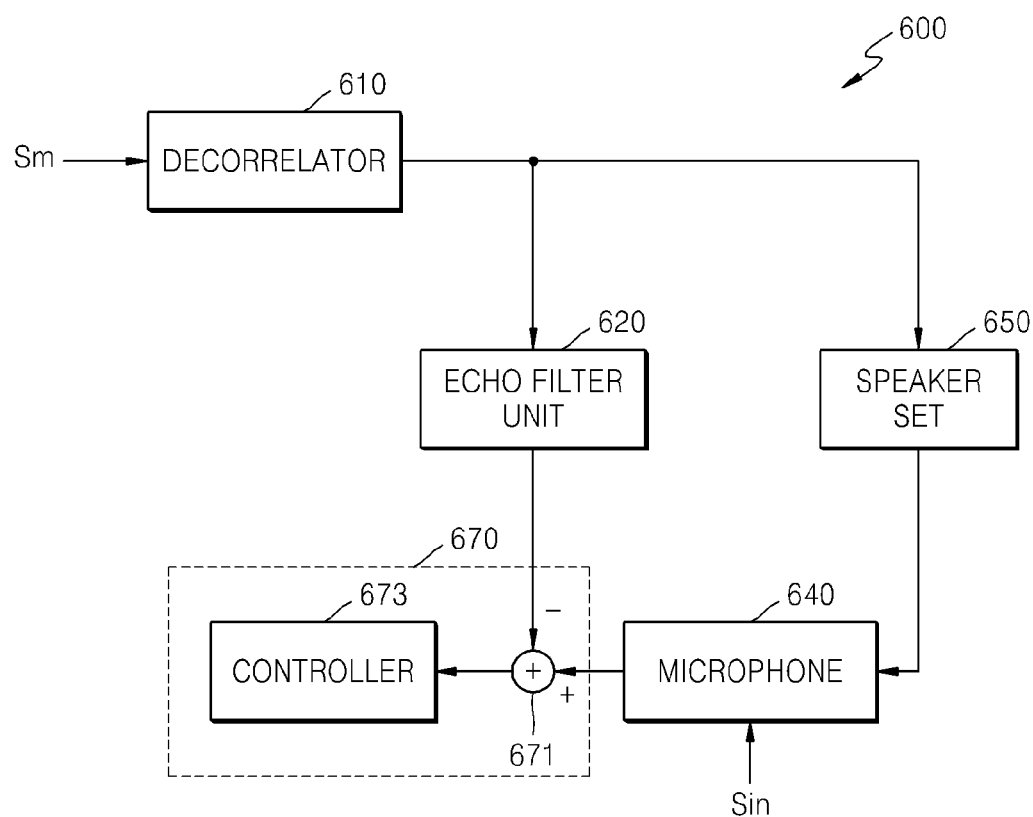
FIG. 6 is a block diagram of an electronic apparatus according to an exemplary embodiment.

FIG. 6 is a block diagram of an electronic apparatus 600 according to an exemplary embodiment. Referring to FIG. 6, the electronic apparatus 600 may correspond to the audio apparatus 200 or 300 described with reference to FIGS. 2 to 5B. The electronic apparatus 600 may be an audio apparatus and may further include an echo filter unit 620, a microphone 640, and a processor 670, in comparison with the audio apparatus 200 or 300. A decorrelator 610 and a speaker set 650 of the electronic apparatus 600 correspond to the decorrelator 210 or 310 and the speaker set 250 or 350 of FIG. 2 or 3, respectively. Thus, a repeated description thereof is omitted.

The electronic apparatus 600 includes the decorrelator 610, the echo filter unit 620, the microphone 640, the speaker set 650, and the processor 670.

The decorrelator 610 receives a multi-channel signal Sm including audio signals and outputs decorrelated signals by applying a phase shifting value adjusted based on a correlation difference between the audio signals to the audio signals.

The echo filter unit 620 generates echo signals corresponding to the decorrelated signals output from the decorrelator 610.

The speaker set 650 outputs acoustic signals corresponding to the decorrelated signals. For example, the decorrelated signals are a first channel decorrelated signal and a second channel decorrelated signal as described above. Hereinafter, an acoustic signal corresponding to the first channel decorrelated signal is called an R-channel audio signal, and an acoustic signal corresponding to the second channel decorrelated signal is called an L-channel audio signal.

The microphone 640 receives a voice signal Sin and the acoustic signals output from the speaker set 650.

The voice signal Sin may be a signal due to talking by the user to control an operation of the electronic apparatus 600 by voice recognition. Alternatively, the voice signal Sin may be a signal due to talking by the user to input the signal into the electronic apparatus 600. The L-channel audio signal may be output through the paths 121, 122, and 123 of FIG. 1, and the R-channel audio signal may be output through the paths 111, 112, and 113 of FIG. 1. The microphone 640 may receive the L-channel audio signal transmitted through the paths 121, 122, and 123 and receive the R-channel audio signal transmitted through the paths 111, 112, and 113. That is, the microphone 640 may receive the voice signal Sin, the L-channel audio signal, and the R-channel audio signal.

In detail, the echo filter unit 620 estimates the acoustic signals output from the speaker set 650 and input to the microphone 640, which may vary according to a surrounding environment where the electronic apparatus 600 is located. The paths of the acoustic signals input to the microphone 640 may be actual acoustic echo paths and vary according to a surrounding environment, and it is difficult to clearly determine the actual acoustic echo paths. Thus, the echo filter unit 620 may estimate echo paths corresponding to the actual acoustic echo paths and generate estimated acoustic signals based on the estimated echo paths. The estimated acoustic signals correspond to the actual acoustic signals output from the speaker set 650.

The processor 670 performs voice recognition processing on a subtraction signal obtained by subtracting the echo signals from an output signal of the microphone 640. In detail, the processor 670 may include a controller 673 and the adder 671.

The adder 671 generates the subtraction signal by subtracting the echo signals output from the echo filter unit 620 from the output signal of the microphone 640.

The controller 673 performs voice recognition processing on the subtraction signal output from the adder 671. In detail, the controller 673 recognizes voice corresponding to the subtraction signal and performs an operation corresponding to the recognized voice.

For example, the echo filter unit 620 may generate a first estimated acoustic signal by estimating an acoustic signal output from a first speaker (not shown) included in the speaker set 650 and generate a second estimated acoustic signal by estimating an acoustic signal output from a second speaker (not shown) included in the speaker set 650. The adder 671 subtracts the first and second estimated acoustic signals output from the echo filter unit 620 from the output signal of the microphone 640. Then, the controller 673 may perform voice recognition processing on an output signal of the adder 671 and recognize a command or data according to the output signal of the adder 671.

In addition, the above-described echo cancellation filter (not shown) may consist of the echo filter unit 620 and the adder 671.

Figure 7:
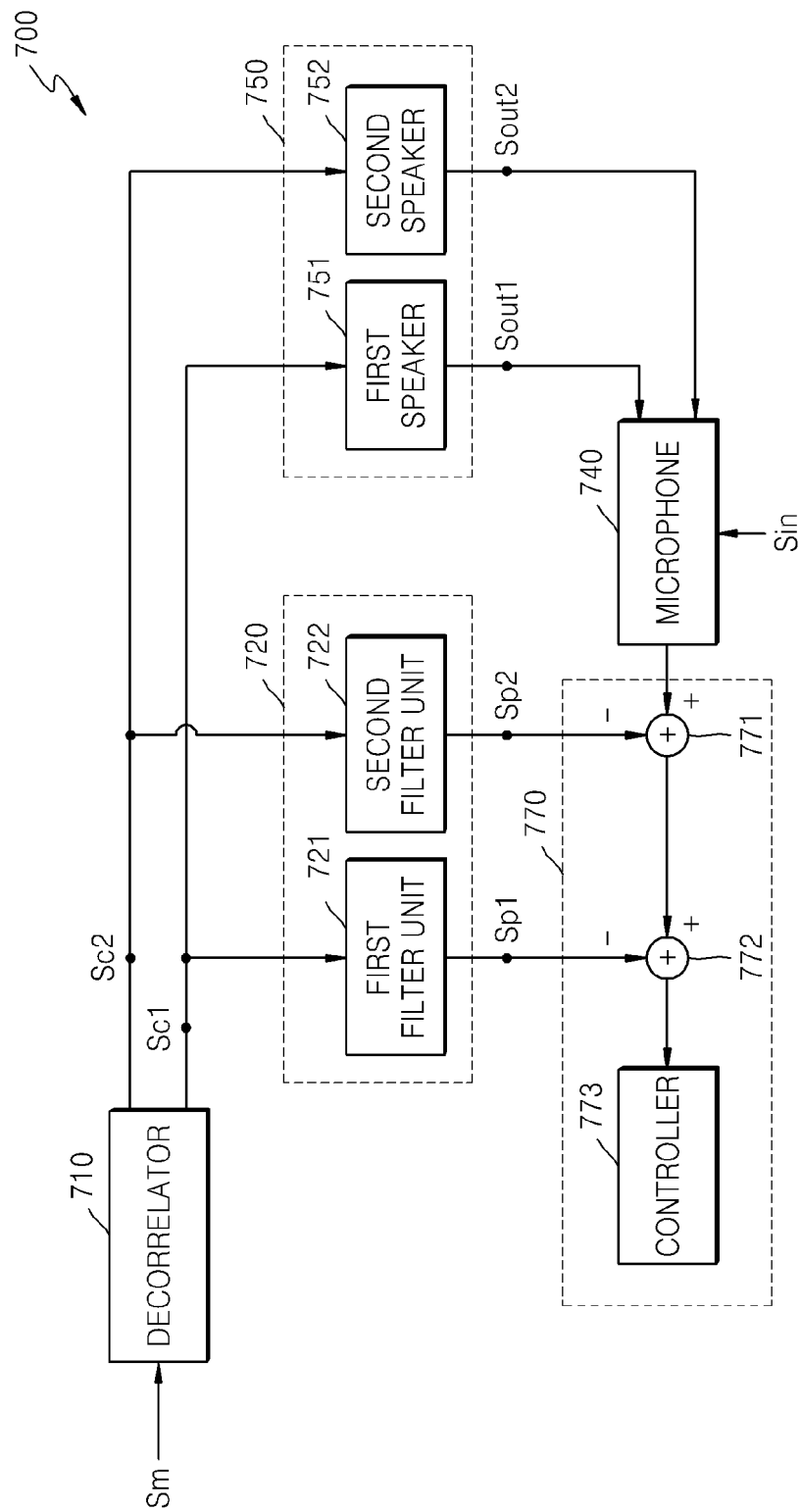
FIG. 7 is a block diagram of an electronic apparatus according to an exemplary embodiment.

FIG. 7 is a block diagram of an electronic apparatus 700 according to an exemplary embodiment.

Referring to FIG. 7, the electronic apparatus 700 corresponds to the electronic apparatus 600 of FIG. 6. In the electronic apparatus 700 of FIG. 7, which is compared with the device 600 of FIG. 6, a multi-channel signal Sm input to a decorrelator 710 includes first and second channel audio signals, a speaker set 750 includes a first speaker 751 for outputting the first channel audio signal and a second speaker 752 for outputting the second channel audio signal, and an echo filter unit 720 includes a first filter unit 721 and a second filter unit 722. In addition, a processor 770 may include a controller 773 and two adders 771 and 772.

The decorrelator 710 outputs a first channel decorrelated signal Sc1 corresponding to the first channel audio signal and a second channel decorrelated signal Sc2 corresponding to the second channel audio signal.

The first speaker 751 receives the first channel decorrelated signal Sc1 and outputs an R-channel audio signal Sout1, which is an acoustic signal which a user can audibly recognize. The second speaker 752 receives the second channel decorrelated signal Sc2 and outputs an L-channel audio signal Sout2, which is an acoustic signal which the user can audibly recognize.

A microphone 740 receives a voice signal Sin, the R-channel audio signal Sout1, and the L-channel audio signal Sout2 and outputs the voice signal Sin, the R-channel audio signal Sout1, and the L-channel audio signal Sout2.

The first filter unit 721 receives the first channel decorrelated signal Sc1 and estimates echo paths through which the R-channel audio signal Sout1 is output. Then, the first filter unit 721 generates a first estimated acoustic signal Sp1 corresponding to the first channel decorrelated signal Sc1 by applying the first channel decorrelated signal Sc1 to the estimated echo paths.

The second filter unit 722 receives the second channel decorrelated signal Sc2 and estimates echo paths through which the L-channel audio signal Sout2 is output. Then, the second filter unit 722 generates a second estimated acoustic signal Sp2 corresponding to the second channel decorrelated signal Sc2 by applying the second channel decorrelated signal Sc2 to the estimated echo paths.

The adder 771 subtracts the second channel decorrelated signal Sc2 from an output signal of the microphone 740. The adder 772 subtracts the first channel decorrelated signal Sc1 from an output signal of the adder 771. Although the two adders 771 and 772 are included in the processor 770 in FIG. 7, one adder may be used to subtract the first and second channel decorrelated signals Sc1 and Sc2 from the output signal of the microphone 740.

FIG. 8 is a flowchart illustrating an audio signal processing method 800 according to an exemplary embodiment. The audio signal processing method 800 may be performed by the audio apparatus 200 or 300 or the electronic apparatus 600 or 700. Hereinafter, the audio signal processing method 800 is described with reference to the audio apparatus 200.

Referring to FIG. 8, in operation 810, a multi-channel signal including audio signals is received. Operation 810 may be performed by the decorrelator 210.

In operation 820, a phase shifting value is adjusted based on a correlation difference between the audio signals included in the multi-channel signal received in operation 810. Operation 820 may be performed by the decorrelator 210.

In operation 830, decorrelated signals are generated by applying the phase shifting value adjusted in operation 820 to the audio signals included in the multi-channel signal. Operation 830 may be performed by the decorrelator 210.

The decorrelated signals generated in operation 830 may be output through the plurality of speakers included in the speaker set 250.

Operations of the audio signal processing method 800 are the same as an operation of the audio apparatus 200 or 300 or the electronic apparatus 600 or 700. Thus, a detailed description thereof is omitted.

FIG. 9 is a flowchart illustrating an audio signal processing method 900 according to an exemplary embodiment. The audio signal processing method 900 may be performed by the audio apparatus 300 or the electronic apparatus 600 or 700. Hereinafter, the audio signal processing method 900 is described with reference to the audio apparatus 300.

Referring to FIG. 9, since operation 910 is the same as operation 810, a detailed description thereof is omitted. Hereinafter, a description is provided by assuming that a multi-channel signal, including first and second channel audio signals, is received.

In operation 920, the multi-channel signal received in operation 910 is divided into a plurality of sub-bands. In detail, the first and second channel audio signals are divided into the plurality of sub-bands, and first and second channel sub-audio signals are generated in each of the plurality of sub-bands. Operations 910 and 920 may be performed by the pre-processor 320.

In operation 930, a phase shifting value in a predetermined sub-band is adjusted based on a phase difference between the first and second channel sub-audio signals in the predetermined sub-band. Operation 930 may be performed by the decorrelation processor 330.

In operation 940, first and second sub-decorrelated signals are generated by applying the phase shifting value in the predetermined sub-band, which is generated in operation 930, to the first and second channel sub-audio signals in the predetermined sub-band. Operation 940 may be performed by the decorrelation processor 330.

In operation 950, first and second decorrelated signals are generated by synthesizing first and second sub-decorrelated signals generated for the plurality of sub-bands. Operation 950 may be performed by the synthesizer 340.

The first and second decorrelated signals generated in operation 950 may be output through the first and second speakers 351 and 352 included in the speaker set 350.

Operations of the audio signal processing method 900 are the same as an operation of the audio apparatus 300 or the electronic apparatus 600 or 700. Thus, a detailed description thereof is omitted.

Figure 10:
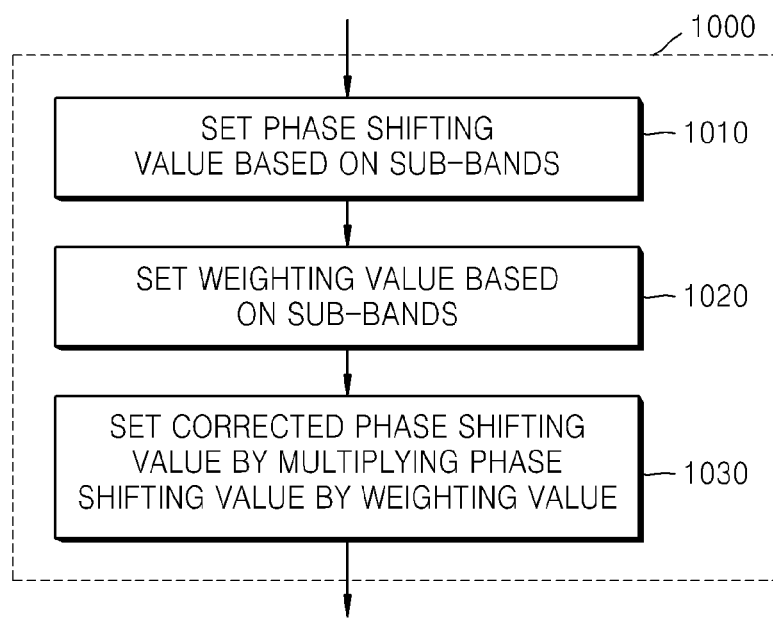
FIG. 10 is a flowchart for describing operation 930 of FIG. 9 in more detail.

FIG. 10 is a flowchart for describing operation 930 of FIG. 9 in more detail.

Referring to FIG. 10, operation 930 corresponds to operation 1000, which may include operations 1010, 1020, and 1030.

In operation 1010, a phase shifting value is set based on sub-bands.

In operation 1020, a weighting value is set based on sub-bands.

In operation 1030, a corrected phase shifting value is set by multiplying the phase shifting value set in operation 1010 by the weighting value set in operation 1020.

Since an operation of setting the corrected phase shifting value has been described in detail with reference to FIGS. 5A and 5B, a detailed description thereof is omitted.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, aspects of an exemplary embodiment may be written as a computer program transmitted over a computer-readable transmission medium, such as a carrier wave, and received and implemented in general-use or special-purpose digital computers that execute the programs. Moreover, while not required in all aspects, one or more units of the audio signal processing apparatus can include a processor or microprocessor executing a computer program stored in a computer-readable medium.

As described above, according to an audio signal processing method according to one or more exemplary embodiments, an audio apparatus using the same, and an electronic apparatus using the same, decorrelated signals corresponding to audio signals included in a multi-channel signal are generated based on a correlation between the audio signals. Thus, the audio signals along predetermined echo paths without divergence of an echo filter may be correctly estimated. Accordingly, an accuracy of voice recognition may increase.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. An audio apparatus for recognizing a voice signal, comprising:
   a decorrelator which generates decorrelated signals by applying a phase shifting value adjusted based on a correlation difference between at least two audio signals included in a multi-channel signal to the audio signals; and
   a speaker set including at least two speakers which output acoustic signals corresponding to the decorrelated signals,
   wherein the decorrelator reduces the phase shifting value applied to a decorrelated signal in inverse proportion to a phase difference between the at least two audio signals.

2. The audio apparatus of claim 1, wherein the decorrelator receives the multi-channel signal including first and second channel audio signals.

3. The audio apparatus of claim 2, wherein the decorrelator reduces the phase shifting value in inverse proportion to a phase difference between the first and second channel audio signals.

4. The audio apparatus of claim 3, wherein the decorrelator sets the phase shifting value to 0 when the phase difference between the first and second channel audio signals is 180°.

5. The audio apparatus of claim 3, wherein the decorrelator sets the phase shifting value to a predetermined limit value when the phase difference between the first and second channel audio signals is 0°.

6. The audio apparatus of claim 2, wherein the decorrelator generates first and second decorrelated signals corresponding to the first and second channel audio signals by subtracting the phase shifting value from a phase of the first channel audio signal and adding the phase shifting value to a phase of the second channel audio signal, respectively.

7. The audio apparatus of claim 1, wherein the decorrelator comprises:
a pre-processor which receives the multi-channel signal including first and second channel audio signals, divides the multi-channel signal into a plurality of sub-bands, and generates first and second channel sub-audio signals in each of the plurality of sub-bands;
a decorrelation processor which generates first and second sub-decorrelated signals by applying a phase shifting value adjusted based on a phase difference between the first and second channel sub-audio signals to the first and second channel sub-audio signals; and
a synthesizer which generates the first decorrelated signal by synthesizing the first sub-decorrelated signals in the plurality of sub-bands and generates the second decorrelated signal by synthesizing the second sub-decorrelated signals in the plurality of sub-bands.

8. The audio apparatus of claim 7, wherein the decorrelation processor generates the first and second sub-decorrelated signals by setting a corrected phase shifting value by multiplying the phase shifting value by a predetermined weighting value based on sub-bands, subtracting the corrected phase shifting value from a phase of the first channel sub-audio signal, and adding the corrected phase shifting value to a phase of the second channel sub-audio signal.

9. The audio apparatus of claim 8, wherein the decorrelation processor sets the predetermined weighting value based on sub-bands.

10. The audio apparatus of claim 8, wherein the decorrelation processor sets the predetermined weighting value in one sub-band and the predetermined weighting value in another sub-band adjacent to the one sub-band to have different signs.

11. The audio apparatus of claim 7, wherein the decorrelation processor divides the plurality of sub-bands into a plurality of groups and sets the predetermined weighting value in each of the groups.

12. The audio apparatus of claim 11, wherein the decorrelation processor sets the predetermined weighting value in one group and the predetermined weighting value in another group adjacent to the one group to have different signs.

13. The audio apparatus of claim 1, further comprising:
an echo filter unit which generates echo signals corresponding to the decorrelated signals;
a microphone which receives the acoustic signals and a voice signal; and
a processor which processes voice recognition on a subtraction signal obtained by subtracting the echo signals from an output signal of the microphone.

14. An electronic apparatus for recognizing a voice signal, comprising:
a decorrelator which generates decorrelated signals by applying a phase shifting value adjusted based on a correlation difference between at least two audio signals included in a multi-channel signal to the audio signals;
an echo filter unit which generates echo signals corresponding to the decorrelated signals;
a speaker set including at least two speakers which output acoustic signals corresponding to the decorrelated signals;
a microphone which receives the acoustic signals and a voice signal; and
a processor which processes voice recognition on a subtraction signal obtained by subtracting the echo signals from an output signal of the microphone,
wherein the decorrelator reduces the phase shifting value applied to a decorrelated signal in inverse proportion to a phase difference between the at least two audio signals.

15. The electronic apparatus of claim 14, wherein the echo filter unit comprises:
an adder which generates the subtraction signal by subtracting the echo signals from an output signal of the microphone; and
a processor which recognizes a voice corresponding to the subtraction signal and performs an operation corresponding to the recognized voice.

16. An audio signal processing method for recognizing a voice signal comprising:
receiving, performed by at least one processor, a multi-channel signal including at least two audio signals;
adjusting a phase shifting value based on a correlation difference between the audio signals; and
generating, performed by the at least one processor, decorrelated signals by applying thea phase shifting value to the at least two audio signals,
wherein the adjusting of the phase shifting value comprises reducing the phase shifting value in inverse proportion to a phase difference between the at least two audio signals.

17. The audio signal processing method of claim 16, wherein the receiving of the multi-channel signal comprises receiving the multi-channel signal, including first and second channel audio signals, and
wherein the generating of the decorrelated signals comprises generating the decorrelated signals by applying the phase shifting value adjusted based on a phase difference between the audio signals to the audio signals.

18. The audio signal processing method of claim 17, wherein the adjusting of the phase shifting value comprises generating first and second decorrelated signals corresponding to the first and second channel audio signals by subtracting the phase shifting value from a phase of the first channel audio signal and adding the phase shifting value to a phase of the second channel audio signal, respectively.

19. The audio signal processing method of claim 17, wherein the adjusting of the phase shifting value comprises:
dividing the multi-channel signal into a plurality of sub-bands and generating first and second channel sub-audio signals in each of the plurality of sub-bands; and
adjusting the phase shifting value based on a phase difference between the first and second channel sub-audio signals in each of the plurality of sub-bands, and
wherein the generating of the decorrelated signals comprises:
generating first and second sub-decorrelated signals by applying the phase shifting value in a predetermined sub-band to first and second channel sub-audio signals in the predetermined sub-band; and
generating the first decorrelated signal by synthesizing the first sub-decorrelated signals in the plurality of sub-bands and generating the second decorrelated signal by synthesizing the second sub-decorrelated signals in the plurality of sub-bands.

20. The audio signal processing method of claim 19, wherein the adjusting of the phase shifting value comprises:
setting the phase shifting value for each of the plurality of sub-bands;

setting a weighting value for each of the plurality of sub-bands; and setting a corrected phase shifting value by multiplying the phase shifting value by the weighting value for each of the plurality of sub-bands.

21. An audio apparatus recognizing a voice signal, comprising:
a decorrelator comprising a circuit which receives a multi-channel signal,
wherein the decorrelator applies the phase shifting value adjusted according to a correlation difference between at least two audio signals in the multi-channel signal and generates decorrelated signals, and
wherein the decorrelator reduces the phase shifting value applied to a decorrelated signal in inverse proportion to a phase difference between the at least two audio signals.

22. The audio apparatus of claim 21, wherein the multi-channel signal includes first and second channel audio signals.

23. The audio apparatus of claim 21, wherein the decorrelator comprises:
a pre-processor which receives the multi-channel signal including first and second channel audio signals, divides the multi-channel signal into a plurality of sub-bands, and generates first and second channel sub-audio signals in each of the plurality of sub-bands;
a decorrelation processor which generates first and second sub-decorrelated signals by applying a phase shifting value adjusted based on a phase difference between the first and second channel sub-audio signals to the first and second channel sub-audio signals; and
a synthesizer which generates the first decorrelated signal by synthesizing the first sub-decorrelated signals in the plurality of sub-bands and generates the second decorrelated signal by synthesizing the second sub-decorrelated signals in the plurality of sub-bands.

* * * * *